United States Patent [19]

Kitai et al.

[11] 4,210,395
[45] Jul. 1, 1980

[54] ELECTRONIC PROGRAMMED SHUTTER

[75] Inventors: Kiyoshi Kitai; Hiroaki Ishida, both of Chiba, Japan

[73] Assignee: Seiko Koki Kabushiki Kaisha, Tokyo, Japan

[21] Appl. No.: 961,733

[22] Filed: Nov. 17, 1978

[30] Foreign Application Priority Data

Nov. 18, 1977 [JP] Japan ............................... 52/154880

[51] Int. Cl.² .............................................. G03B 9/08
[52] U.S. Cl. .................................................. 354/234
[58] Field of Search ............................. 354/26, 29–33, 354/234, 235, 230, 38, 34

[56] References Cited

U.S. PATENT DOCUMENTS

| | | | |
|---|---|---|---|
| 3,720,152 | 3/1973 | Uchiyama et al. ............... | 354/234 X |
| 4,109,258 | 8/1978 | Arisaka et al. ........................... | 354/38 |

Primary Examiner—Donald A. Griffin
Attorney, Agent, or Firm—Robert E. Burns; Emmanuel J. Lobato; Bruce L. Adams

[57] ABSTRACT

An electronic programmed shutter has a sector which is also used as an aperture vane, a sector opening and closing lever normally biased in the sector closing direction, a driving member which is moved in a linear direction by a release operation of the shutter, an electromagnetic device for controlling the closing time of the shutter by an electronic switching circuit, and a driving lever having a first cam face acting in such a direction as the sector is opened by the sector opening and closing lever and a second cam face coacting with the electromagnetic device. The driving level is movably supported on the driving member such that the sector opening and closing lever is rotated by the driving force of the driving member via the driving lever to effect opening of the sector and the cooperative relation between the sector opening and closing lever and the driving lever is released by the electromagnetic device to effect closing of the sector by the normal bias applied to the sector opening and closing lever.

2 Claims, 1 Drawing Figure

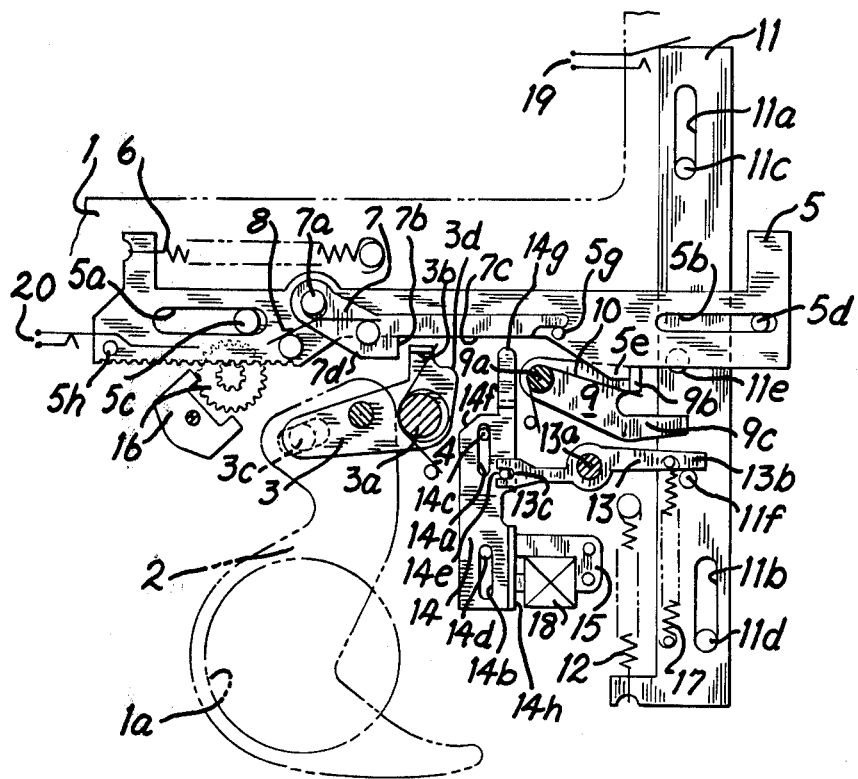

ELECTRONIC PROGRAMMED SHUTTER

BACKGROUND OF THE INVENTION

The present invention relates generally to a programmed shutter and more particularly to an electronic programmed shutter having an extremely simple construction in which a sector also used as an aperture vane is normally biased in such a direction as the same is closed, the sector is opened by a driving member which is moved at a specified speed, the cooperative relation between the sector and the driving member being released by an electromagnetic device, and the sector is closed under its own characteristic to obtain an exposure suitable for taking a photograph.

In a conventional type of electronic programmed shutter of the type described above, a system has been proposed comprising a sector which is also used as an aperture vane, a first ring having a motive force acting in such a direction as the sector is closed and a second ring having a motive force acting in such a direction as the sector is opened. The second ring has a driving lever thereon for engaging with the first ring and the second ring starts its operation by the release operation. The first ring is operated via the driving lever to open the sector, and the driving lever is operated by an electromagnetic device to interrupt the relation between the second ring and the first ring and thereby the sector is closed by the self-motive force of the first ring.

However, in such a system having two rings as described above, it is not preferable to employ the system due to the following disadvantages. One disadvantage is that when the shutter is charged in relation with the winding up of the film in a camera, it is required to arrange a linkage mechanism between the winding-up mechanism of the camera and the second ring in order to move the second ring to a starting position and thus the space within the camera is necessarily increased resulting in a relatively large size high cost camera. Another disadvantage is that both the first ring and the second ring encircle the photographing aperture resulting in an increase of the contact area of the first and second rings and also an increase of operational friction. Further, the component parts are made of larger size requiring more space and thus miniaturization and lightness in weight of the shutter cannot be obtained. A further disadvantage is that the inner diameter of the first ring for use in operating the sector is required to be a dimension of high accuracy and thus it is not possible to ignore the production cost of the component parts.

SUMMARY OF THE INVENTION

The present invention provides an electronic programmed shutter which overcomes the above described disadvantages and which is small in size and light in weight so that a small sector opening and closing lever having a powerful force acting in such a direction as the sector is closed is rotated by a return driving force of the set member which is moved linearly when the shutter is charged and thereby the sector is opened. When the driving force is released by an electromagnetic device, the sector is closed by the self-driving force of the sector releasing lever.

BRIEF DESCRIPTION OF THE DRAWINGS

The accompanying drawing is a top plan view showing a charged condition of an electronic programmed shutter of the present device.

Referring now to the drawing, a preferred embodiment of the present invention shown will be described. The accompanying drawing shows the charged condition of the shutter, reference numeral 1 indicates a shutter base plate, and reference numeral 1a represents a photographing aperture.

Reference numeral 2 indicates one of a set of sectors which are also used as aperture vanes, and only one of them is illustrated for clarity of illustration. Reference numeral 3 is a sector opening and closing lever which is rotated about a pin 3a on the shutter base plate and has a raised part 3b, pin 3c freely fitting in a groove of the sector 2, and a projection 3d. The sector opening and closing lever is biased in a counter-clockwise direction by a spring 4 to keep the sector 2 in a closed condition.

Reference numeral 5 indicates a driving member having longitudinal slots 5a and 5b which are guided by the pins 5c and 5d mounted on the shutter base plate 1 and further biased in a rightward direction by a spring 6. The driving member 5 is provided with a projection 5e and has pins 5g and 5h mounted thereon. Further, the driving member 5 is formed with a rack 5f engaging with a governor device 16. Reference numeral 7 is a driving lever which is rotated about a pin 7a on the driving member 5, the driving lever having cam faces 7b and 7c and an inclined face 7d and being biased in a clockwise direction by a spring 8 and its position is set by the pin 5g on the driving member 5. Reference numeral 9 indicates an engaging pawl which is rotated about a pin 9a on the shutter base plate 1, the pawl having an arm 9c and a raised part 9b engaging with the projection 5e of the driving member 5 and being biased in a counter-clockwise direction by a spring 10. Reference numeral 11 shows a release member having longitudinal slots 11a and 11b which are guided by the pins 11c and 11d mounted on the shutter base plate 1 and the release member is stopped at its raised position by a spring 12. The release member 11 is provided with pins 11e and 11f. Reference numeral 13 indicates a cooperative lever which is rotated about a pin 13a on the shutter base plate 1 and which is connected to the release member 11 by a spring 17 and has a fork part 13c and a part 13b abutting against the pin 11f of the release member 11. Reference numeral 14 indicates a movable iron core of a solenoid which has longitudinal slots 14a and 14b and which is guided by the pins 14c and 14d mounted on the shutter base plate 1 and has a pin 14e freely fitted in the fork part 13c of the cooperative lever 13. The movable iron core 14 is formed with a cam face 14f for restricting the projection 3d of the sector opening and closing lever 3, a projection 14g opposite to the cam face 7c of the driving lever 7, and an armature 14h. Reference numeral 15 shows an iron core of the solenoid which is fixed to the shutter base plate 1. Reference numeral 18 indicates a coil of the solenoid device.

Reference numeral 19 shows a power supply switch and reference numeral 20 indicates a start switch for an electronic switching circuit. The circuit diagram including the switches 19 and 20 is well known in the art and thus an illustrative representation thereof is eliminated.

The operation of the electronic programmed shutter will now be described.

When the release member 11 is pushed down from the condition shown in the drawing, the initial operation of the release member 11 will cause the power supply switch 19 to be closed, the coil 18 to be energized and thereby the movable iron piece 14 is retracted by the magnetic attraction of the armature 14h to the iron core 15. At this time, since the pin 11f of the release member 11 is descended, the cooperative lever 13 which is connected to the release member 11 by the spring 17 is rotated in a clockwise direction and thus the movable iron piece 14 is slightly raised and then stopped. When the release member 11 is further pushed down, the spring 17 is tensioned and the pin 11e of the release member 11 will push the arm part 9c of the engaging pawl 9 to cause the engaging pawl 9 to be rotated in a clockwise direction, the raised part 9b of the engaging pawl 9 will release the engagement of the projection 5e of the driving member 5 and the driving member 5 will start its rightward movement. At this time, the driving member 5 is moved slowly under the control of the governor device 16, the switch 20 is opened by the pin 5h of the driving member 5 and thereby the electronic switching circuit is energized. In relation to this operation, the cam face 7b of the driving lever 7 on the driving member 5 will push the raised part 3b of the sector opening and closing lever 3, the sector opening and closing lever 3 will start to rotate in a clockwise direction against the spring 4 and thereby the sector 2 is opened. The switching circuit is reversed in reference to information of the brightness of the object to be photographed, the electrical supply to the coil 18 is cut off and the iron core 15 is deenergized. Thereafter, the movable iron piece 14 to which the tension force of the spring 17 is transmitted via the cooperative lever 13 is raised abruptly, the projection 14g is abutted against the cam face 7c of the driving lever 7 and the driving lever 7 is rotated in a counter-clockwise direction against the spring 8. Since the cam face 7b of the driving lever 7 is rotated out of the path of travel of the raised part 3b of the sector opening and closing lever 3, the driving force of the driving member 5 transmitted to the sector opening and closing lever 3 is terminated, and the sector opening and closing lever 3 is rotated in a counter-clockwise direction by the spring 4 to close the sector 2.

At this time, since the movable iron piece 14 is kept at its raised position, when the sector opening and closing lever 3 is about to rotate in the direction in which the sector 2 is opened again due to rebounding, etc. of the lever, the projection 3d of the sector opening and closing lever 3 is abutted against the face 14f of the movable iron piece 14 and thereby the rotation of the sector 2 is prevented.

Upon completion of the photographing, a releasing of the pressing of the release member 11 will cause the release member 11 to be raised by the spring 12. At this time, the cooperative lever 13 is rotated in a counter-clockwise direction by the pin 11f of the release member 11 and along with this movement the movable iron piece 14 is also returned to its initial position. When the release member 11 is at its raised position, the switch 19 is opened to cut off the power supply for the shutter circuit.

In accordance with the present invention, the sector is operated by a relatively small sector opening and closing lever and its opening operation is performed by a setting member for use in changing the shutter and thus it is possible to provide a direct cooperative relation with the winding up mechanism of the camera. When it is desired to drive the driving member 5 in such an opposite direction as that of the shutter operation in preparation for the next photographing, the raised part 3b of the sector opening and closing lever 3 and the inclined face 7d of the driving lever 7 are operated to cause the driving lever 7 to be rotated in a counter-clockwise direction and such enables the lever to ride over the sector opening and closing lever 3 and thus the sector opening and closing lever 3 will not operate the sector 2. Thus, it is not required to provide another mechanism for use in cutting off the light from the film.

As described above, in accordance with the present invention, it is possible to provide a trouble-free and economical electronic programmed shutter for use in a camera which is extremely simple in construction, small in size, light in weight, and thus it is possible to provide a great effect in a practical system.

What is claimed is:

1. In an electronic programmed shutter of the type having a moveable sector which is also used as an aperture vane: a pivotably mounted sector opening and closing lever for effecting movement of said sector and being normally biased in the sector-closing direction, a driving member moveable in a linear direction by a release operation of the shutter, an electromagnetic device for controlling the closing time of the shutter by an electronic switching circuit, and a driving lever movably supported on said driving member and having a first part engageable with said sector opening and closing lever to pivot the same in the sector-opening direction to thereby effect opening movement of said sector to initiate an exposure in response to driving movement of said driving member and having a second part coacting with said electromagnetic device to effect disengagement of said driving lever from said sector opening and closing lever which thereafter pivots in the sector-closing direction due to the normal bias applied thereto to effect closing movement of said sector to thereby terminate the exposure.

2. An electronic programmed shutter as set forth in the claim 1; in which said electromagnetic device has means for restricting movement of said sector opening and closing lever from the sector closing position after termination of an exposure.

* * * * *